(12) United States Patent
Bouché

(10) Patent No.: US 8,087,318 B2
(45) Date of Patent: Jan. 3, 2012

(54) SPUR GEAR TRANSMISSION

(75) Inventor: Bernhard Bouché, Bargteheide (DE)

(73) Assignee: Getriebebau NORD GmbH & Co. KG, Bargteheide (DE)

( * ) Notice: Subject to any disclaimer, the term of this patent is extended or adjusted under 35 U.S.C. 154(b) by 648 days.

(21) Appl. No.: 11/887,593

(22) PCT Filed: Sep. 28, 2005

(86) PCT No.: PCT/EP2005/010493
§ 371 (c)(1),
(2), (4) Date: Oct. 1, 2007

(87) PCT Pub. No.: WO2006/105809
PCT Pub. Date: Oct. 12, 2006

(65) Prior Publication Data
US 2009/0044649 A1    Feb. 19, 2009

(30) Foreign Application Priority Data
Apr. 1, 2005    (WO) .................. PCT/EP2005/003427

(51) Int. Cl.
*F16H 1/20* (2006.01)

(52) U.S. Cl. .................................................. 74/421 R

(58) Field of Classification Search ............... 74/412 R, 74/413, 421 A, 421 R, 425, 431, 606 R, 665 B, 74/665 G
See application file for complete search history.

(56) References Cited

U.S. PATENT DOCUMENTS

| | | | | |
|---|---|---|---|---|
| 1,488,985 A | * | 4/1924 | Hoge | 74/421 R |
| 5,156,069 A | * | 10/1992 | Bitsch et al. | 74/606 R |
| 5,220,852 A | * | 6/1993 | Shinoda et al. | 74/606 R |
| 6,205,877 B1 | * | 3/2001 | Vilain | 74/413 |

FOREIGN PATENT DOCUMENTS

DE    31 33 635 A1    1/1983
(Continued)

OTHER PUBLICATIONS

Torelli C: "Universell Einsetzbare Getriebe Mit Monoblock-Gehause" Antriebstechnik, Krausskopf Verlag Fur Wirtschaft GMBH. Mainz, DE, vol. 31, No. 8, Aug. 1, 1992, pp. 50, 53-54, 56, XP000298656 ISSN: 0722-8546.

*Primary Examiner* — Vicky Johnson
(74) *Attorney, Agent, or Firm* — Alix, Yale & Ristas, LLP

(57) ABSTRACT

Two-stage or three-stage spur gear transmission having a single-piece housing which has a drive-input-side cover opening and a closing cover which closes off said cover opening, having a drive output shaft which supports a drive output gearwheel between two bearings, and having an intermediate shaft which supports an intermediate gearwheel, which is driven directly or indirectly by an input drive pinion, and an intermediate pinion, which meshes with the drive output gearwheel, and is mounted by means of two intermediate shaft bearings which are adjacent to the intermediate pinion. The two intermediate shaft bearings which are adjacent to the intermediate pinion are arranged in a drive-output-side chamber, which is preferably not undercut in the direction of the assembly opening, of the housing. A third intermediate shaft bearing is arranged in a bearing bore of the cover. Said cover is centered on said third intermediate shaft bearing along a parting joint which runs perpendicular to the axis direction.

20 Claims, 6 Drawing Sheets

FOREIGN PATENT DOCUMENTS

| | | |
|---|---|---|
| DE | 42 27 702 A1 | 2/1994 |
| DE | 4420305 C1 * | 5/1995 |
| DE | 100 61 501 A1 | 6/2002 |
| EP | 0 507 309 A | 10/1992 |
| EP | 0 686 788 A | 12/1995 |
| EP | 0 686 788 B | 10/1997 |
| FR | 2 441 108 A | 6/1980 |
| GB | 1 227 232 A | 4/1971 |

* cited by examiner

US 8,087,318 B2

SPUR GEAR TRANSMISSION

BACKGROUND OF THE TECHNOLOGY

A known spur gear transmission of EP-A-686788 has a single-piece housing. The latter forms, between a drive-output-side housing wall and a partition, a drive-output-side chamber which contains the drive output shaft with the drive output gearwheel. In order that the drive output gearwheel can be mounted in the drive-output-side chamber, its side wall has to have an assembly opening. This is achieved in that the drive-input-side housing cover is connected to the transmission housing by means of a parting joint which runs at an incline and extends above the drive-output-side chamber. The cover is connected to the transmission housing by fastening screws which run in an axially parallel manner, that is to say not perpendicularly to the parting joint. The housing also forms a drive-input-side chamber into which the motor pinion projects through the cover. Said motor pinion meshes with an intermediate gearwheel which is arranged on an intermediate shaft in the drive-input-side chamber. The intermediate shaft supports an intermediate pinion which drives the drive output gearwheel. Said intermediate shaft is mounted at both sides of the intermediate pinion, specifically in the drive-output-side wall and in the partition. The drive-input-side, exposed end of the intermediate shaft projects into a corresponding bore of the cover in order to centre the latter. This bore is not designed as a bearing.

Said known arrangement has not been proven. Firstly, the assembly is very difficult because the fastening screws exert forces on the cover, which forces have a force component running parallel to the parting joint, which force component seeks to move the cover relative to the housing. However, a movement of said type absolutely must be avoided because it leads to friction contact of the shaft with the centering bore in the cover. This can not only result in damage to the shaft, but can also lead to overloading of the intermediate shaft bearing. It is not obvious how this problem could be solved. In particular, the inclined parting joint cannot easily be replaced with the otherwise customary parting joint which runs perpendicularly to the axial direction because then the assembly of the drive output gearwheel would not be possible. A further disadvantage of the known construction consists in that the inclination of the parting joint requires precise adjustment of the cover about an axis perpendicular to the inclined parting joint, since an imprecise positioning of the cover with respect to this axis would lead to an angular error in the toothing of the input drive pinion with the intermediate gearwheel of the first stage. It is barely practically possible to obtain said precise adjustment. Finally, the known transmission has the disadvantage that the stiffness of the housing is impaired by the inclined profile of the parting joint which extends into the drive-output-side chamber.

Given that the drive output shaft can be mounted with the drive output gearwheel and the associated bearings in the housing which is designed without an undercut, the creation of a lateral assembly opening by an inclined cover joint is unnecessary. The disadvantages explained above can thus be avoided. The assembly is very simple because after inserting the shafts and wheels it is necessary merely to put on the cover. As a result of the third bearing, which is provided in the cover, of the intermediate shaft, the cover is automatically centered. In contrast, the triple bearing arrangement leads to favourable force conditions at the intermediate shaft and its bearings, thereby permitting smaller dimensioning of said bearings and therefore a reduction of the spatial requirement. There are also no additional assembly steps required for axially fixing the shaft, because said axial fixing can be effected by means of the two bearings at the ends of the shaft.

Although a triple bearing arrangement of a transmission shaft is known ("SEW Eurodrive" brochure, FIG. 5.3), this relates to a transmission having a multi-part housing which has an assembly opening not only at the drive input side but also at the drive output side of a housing central part and contains a partition. The triple bearing arrangement of the intermediate shaft of said transmission is situated in bearing bores which are formed by the housing central part. This entails cumbersome assembly, because the intermediate shaft and its bearings must be mounted from both sides of the housing central part. In addition, the multi-part design of the housing has the disadvantages, in relation to single-part housings having only one assembly opening, of reduced stiffness or, for the same stiffness, increased weight and increased costs. It is not possible to gather any indications from said prior art of how to facilitate assembly and avoid centering errors in the transmission specified at the beginning.

SUMMARY

In one disclosed embodiment, the known disadvantage of a triple bearing arrangement of a shaft on account of its static indeterminacy does not apply, because the cover, as a result of the centering action caused by the shaft, is fixed in precisely that position in which the third bearing, which is arranged in the cover, is aligned with the two other bearings. Angular errors in the toothing of the first stage also cannot occur, because the cover joint is perpendicular to the axis direction. A further advantage of the invention is that the central bearing of the three shaft bearings is considerably relieved of load and can therefore be of smaller dimensions. As a result, there is a gain in space in the region of said bearing arrangement, which gain in space can be utilized for the arrangement of the drive output shaft or its bearing arrangement. While, in the case of the first-mentioned known construction, the intermediate gearwheel must be arranged as close as possible to the bearing, which is provided in the partition, of the intermediate shaft in order to limit the bending loading of the shaft, the invention opens up the possibility of arranging said gearwheel remote from the central intermediate shaft bearing. This results in a greater degree of design freedom. For example, this creates the possibility of arranging the drive-input-side drive output shaft bearing and the central intermediate shaft bearing so as to be offset with respect to one another in the axis direction, wherein the central intermediate shaft bearing can be arranged further remote from the drive input than the drive output shaft bearing. Another result of said design freedom is in housings which can be used selectively for two-stage or three-stage transmissions. In the two-stage case, the intermediate gearwheel is to be arranged close to the cover, while in the three-stage case, said intermediate gearwheel is to be mounted remote from the cover, because the position close to the cover is taken up by the further gearwheel. This different positioning of the intermediate gearwheel is possible on account of the invention despite the reduced dimensioning of the intermediate shaft and its bearings, because these are arranged at both sides of the intermediate gearwheel.

The transmission in one embodiment is very easy to assemble, because, for correct assembly of the cover, it is necessary merely to mount the intermediate shaft in its drive-output-side and central bearings and subsequently to place and screw the cover in the position which is predefined in this way. It is particularly easy to assemble when the remaining structure of the housing is also easy to assemble. This applies in particular to a construction in which not only the intermediate shaft but also the drive output shaft with the associated wheels and bearings can be pre-assembled and inserted as a finished unit into the housing. This is the case in a transmission whose drive-output-side chamber is delimited only by two faces, the first of which, for holding the drive output shaft, opens without an undercut in the direction of the drive output side, while the other, for the assembly of the intermediate shaft, opens without an undercut in the direction of the drive input side.

In another embodiment, the drive output shaft unit, like the intermediate shaft unit, can be mounted from the drive input side by virtue of the drive-output-side chamber, for the assembly of the drive output shaft, opening without an undercut in the direction of the drive input side.

The lack of undercut is restricted by the addition that said lack of undercut should be present at least in the unprocessed state of the cast or pressed part. This is intended to prevent this feature from being evaded by means of a turning process which is carried out only during the machining stage and has no effect on the ease of assembly. In the finished state, it is sufficient if the diameter of the holding bore in the case of the drive-input-side bearing of the drive output shaft is at least so large that the drive output gearwheel and the drive-output-side drive output shaft bearing can fit through. In the case of the intermediate shaft, it is correspondingly sufficient if the holding bore in the case of the assembly-side bearing has a diameter which is so large that the intermediate pinion and the drive-output-side bearing of the intermediate shaft can fit through. It is not important whether the holding bore possibly also has a turned portion between said positions.

DETAILED DESCRIPTION

Figure 1:
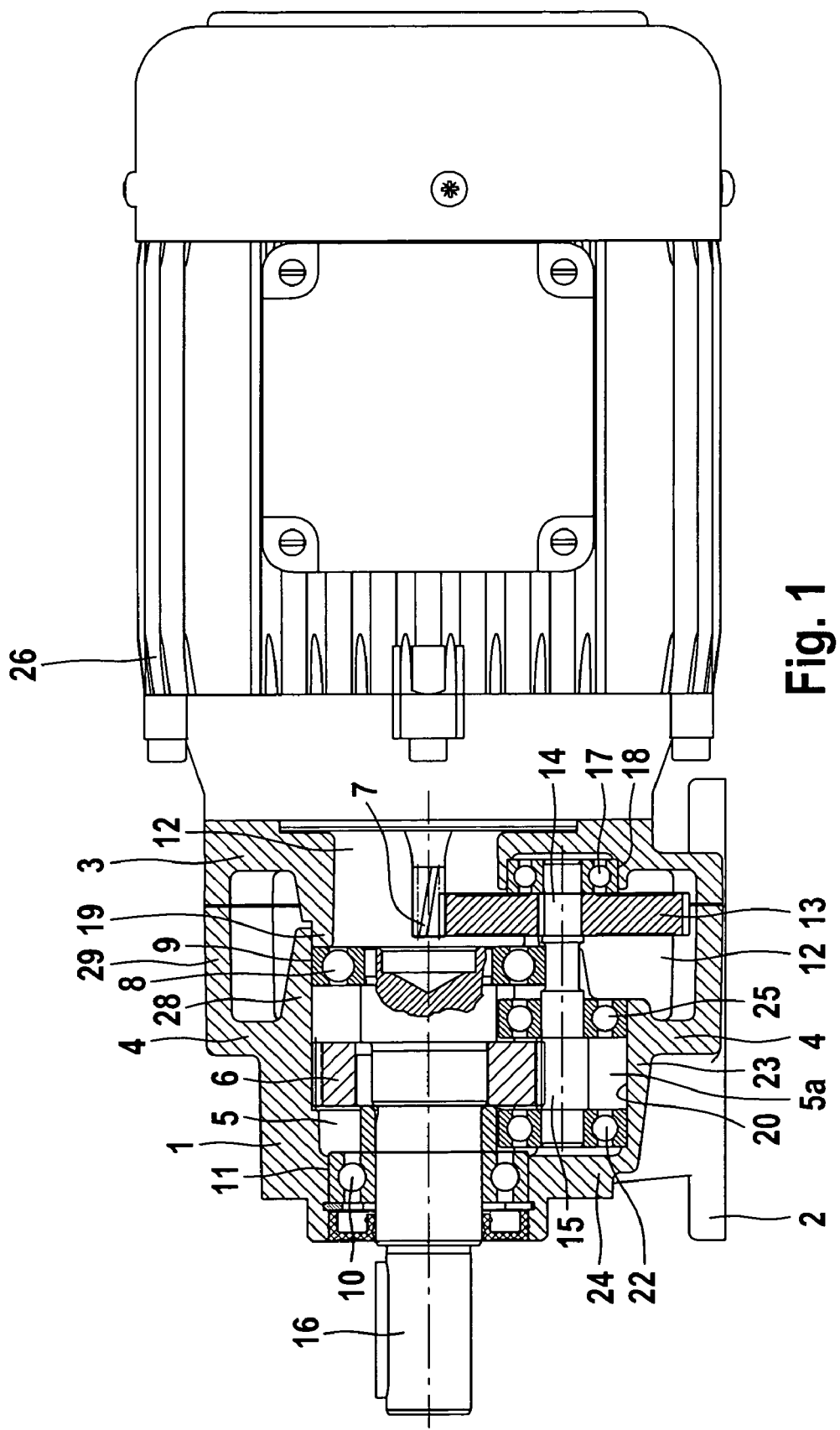
FIG. 1 shows a longitudinal section of a first exemplary embodiment with a flange-mounted motor.
Figure 3:
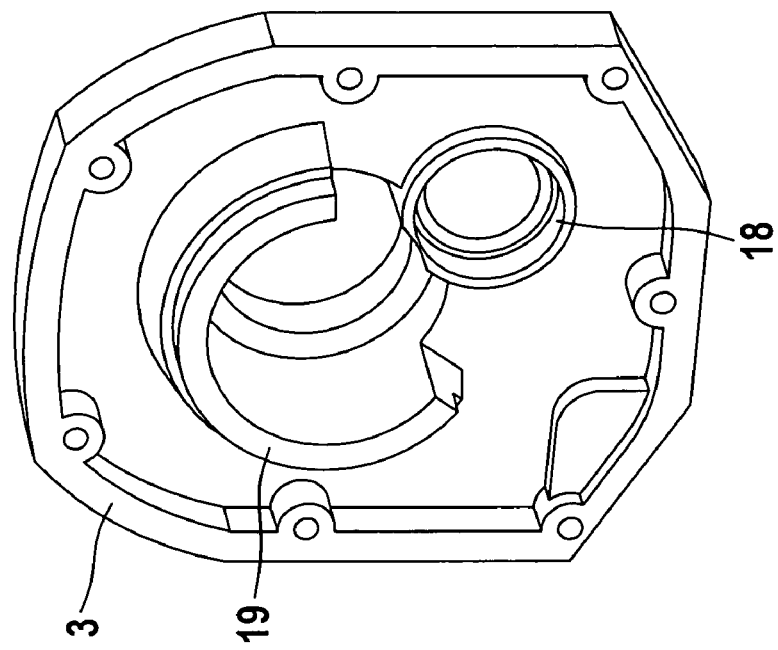
FIG. 3 shows a corresponding view of the cover from the drive output side.
Figure 2:
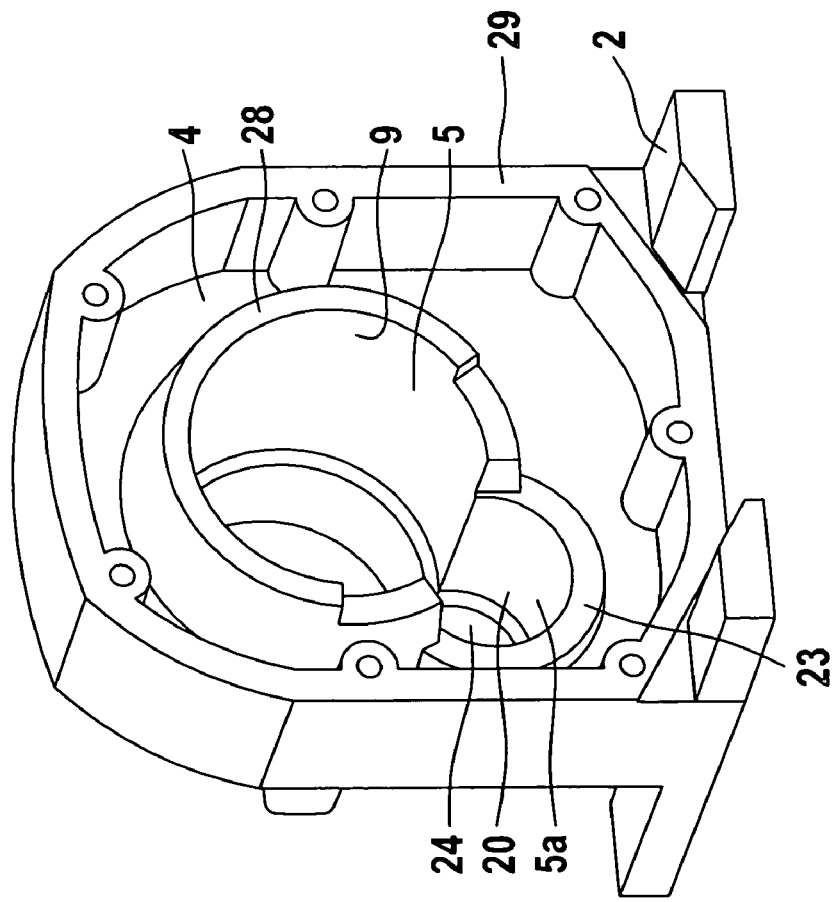
FIG. 2 shows a perspective view of the empty housing from the drive output side.

The transmission housing 1, which in FIG. 1 is hatched from bottom left to top right, of the first exemplary embodiment has a foot 2 and a drive-input-side opening which is closed off by a cover 3 on which, in the example illustrated, a motor 26 is flange-mounted, with an input drive pinion 7 projecting into the transmission housing.

The housing 1 forms a drive-output-side chamber 5 which holds the drive output shaft 16 with the drive output gearwheel 6 and the associated bearings, specifically a drive-input-side bearing 8 in a bearing bore 9 and a drive-output-side bearing 10 in a bearing bore 11. The chamber 5 having the bearing bores 9 and 11 is not undercut as viewed from the drive input side. The drive output shaft 16, the gearwheel 6 and the rolling bearings 8, 10 can therefore be inserted as a pre-assembled unit from the drive input side. The drive output shaft unit is held axially in the chamber 5 at the drive input side by means of a projection 19 of the cover 3 and at the drive output side by a circlip or a housing collar (not shown).

That part of the drive-output-side chamber 5 which holds the drive output shaft 16 is enclosed by a wall 28 which is aligned substantially axially parallel and which extends cylindrically over more than 180° at least in the region of the bearing bores 9 and 11. Said wall 28 is connected to the foot 2, partially by means of ribs and partially by means of a transverse wall 4.

Situated on the drive input side of the housing is a drive-input-side chamber 12 which is enclosed by walls 29 and the cover 3 and in which are situated one or more transmission stages. Shown is an example in which the input drive pinion 7 acts on an intermediate gearwheel 13 which is supported by an intermediate shaft 14. Said intermediate shaft 14 supports, at its other end, an intermediate pinion 15 which meshes with the drive output gearwheel 6. The drive-output-side chamber 5 has, for holding the intermediate shaft 14, a lateral convexity 5a which is surrounded by walls 23 which run substantially axially parallel and is delimited at the drive output side by a wall 24. The cylindrical inner face 20, which extends over more than 180° in circumference, of said lateral convexity 5a forms the bearing bore for two rolling bearings of the intermediate shaft. Of said rolling bearings, the rolling bearing 22 is arranged at the drive-output-side end of the intermediate shaft 14 of the chamber convexity 5a, and the rolling bearing 25 is arranged approximately at the centre of the shaft and at the drive-input-side end of the chamber convexity 5a. This permits support of the intermediate shaft directly at both sides of the highly-loaded intermediate pinion 15. This limits the bending moment which is to be absorbed by the intermediate shaft and permits favourable dimensioning.

A third bearing 17 for the drive-input-side end of the intermediate shaft is situated in a bearing bore 18 of the cover 3. In this way, the intermediate shaft 14 is additionally supported on the free side of the intermediate gearwheel 13. The central bearing is correspondingly relieved of load and can therefore be of space-saving dimensions. In addition, this creates the possibility of arranging the intermediate gearwheel at a relatively great distance from the central bearing 25, which has the advantage that said central bearing 25 of the intermediate shaft and the drive-input-side bearing 8 of the drive output shaft 16 can be arranged axially offset with respect to one another. This makes it possible to place the central bearing 25 of the intermediate shaft—as already discussed above—directly adjacent to the intermediate pinion 15.

The disadvantages of the statically indeterminate arrangement, because of which the triple bearing arrangement of a shaft is normally avoided, are evaded in that the bearing of the shaft in the cover is utilized to centre said cover. This ensures that said third bearing is mounted precisely aligned with the two other bearings. In order that there is no resulting undesired double fit of said bearing in relation to the engagement of the cover projection 19 into the bearing bore 9, said engagement is provided with a correspondingly great degree of play. Like the drive output shaft 16, the intermediate shaft 14 as an assembled unit with the intermediate gearwheel 13 and all bearings 17, 22, 25 can be mounted as a pre-assembled unit from the drive input side of the transmission. The assembly complexity is correspondingly low. At the same time, the advantage is obtained that the entire transmission housing with the exception of the drive-input-side cover 3 is of single-piece design and is correspondingly stiff.

In the second exemplary embodiment, the housing 30 forms a drive-input-side chamber 32, whose opening is closed off by the cover 31, and a drive-output-side chamber 33. The two chambers 32, 33 are separated from one another by a partition 34. A drive input unit 35 is flange-mounted on the cover 31, the input drive pinion 36 of which drive input unit 35 projects into the drive-input-side chamber 32. The drive input unit can be formed by a drive motor or an intermediate housing which forms a special bearing for the shaft of the pinion 36 which is mounted in a floating manner. Alternatively, said shaft can also be mounted on the other side of the pinion 36 by means of a bearing (not illustrated) in the bearing bore 37 of the partition 34.

In the two-stage arrangement illustrated, the input drive pinion 36 acts on an intermediate gearwheel 40 which is seated on an intermediate shaft 41 which forms an intermediate pinion 42. Said intermediate shaft 41 is mounted at three points, specifically by means of a bearing 43 in a bearing bore 44 of the cover 31, by means of a bearing 45 in a bearing bore 46 of the partition 34, and a bearing 47 in a bearing bore 48 in the drive-output-side wall 38 of the drive-output-side chamber 33. The intermediate shaft 41 is fixed in its longitudinal direction in the housing by means of shoulders which delimit the bearing bores 44 and 48.

The intermediate pinion 42 acts on a drive output gearwheel 50 on the drive output shaft 51 which is mounted by means of a bearing 52 in a bearing bore 53 of the partition 34 and by means of a bearing 54 in a bearing bore 55 at the drive-output-side end of the housing. The drive output shaft 51 with the associated parts is secured in the housing by means of a circlip 56 before the bearing 54.

Figure 5:
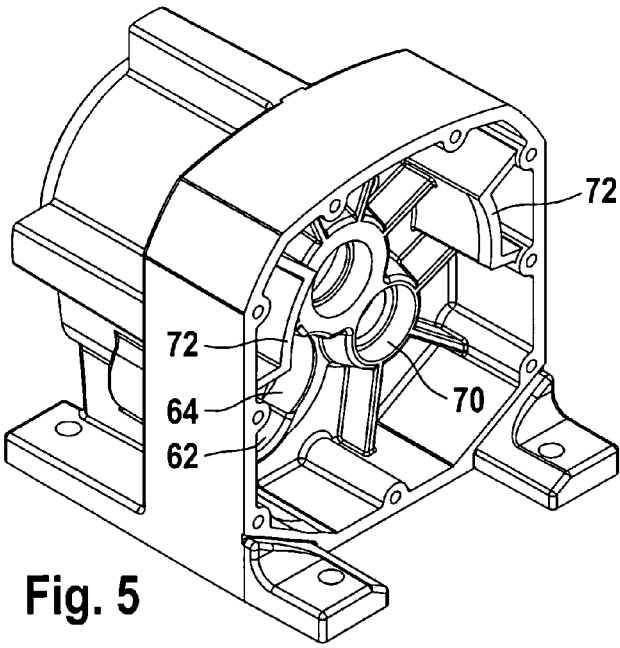
Figure 7:
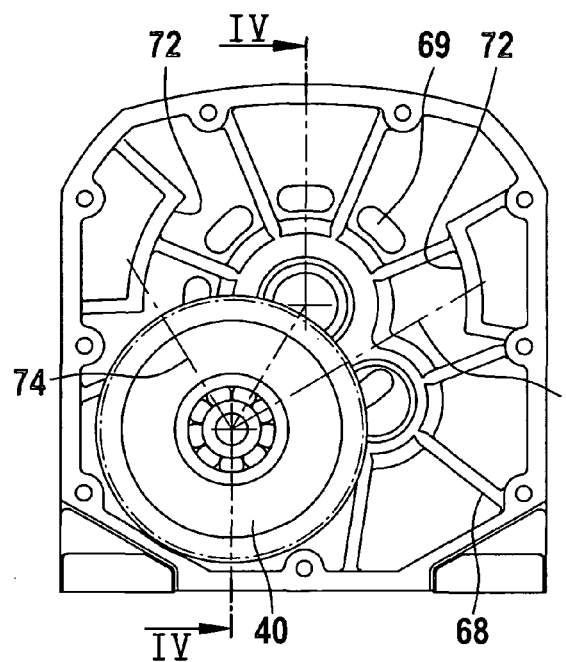
FIG. 7 shows a view of the open housing from the drive input side, with the intermediate shaft.

As can be seen in FIGS. 5 and 7, the partition 34 can be reinforced by means of ribs 68 and contain apertures 69 which have been omitted in some other illustrations for the sake of simplicity.

Figure 9:
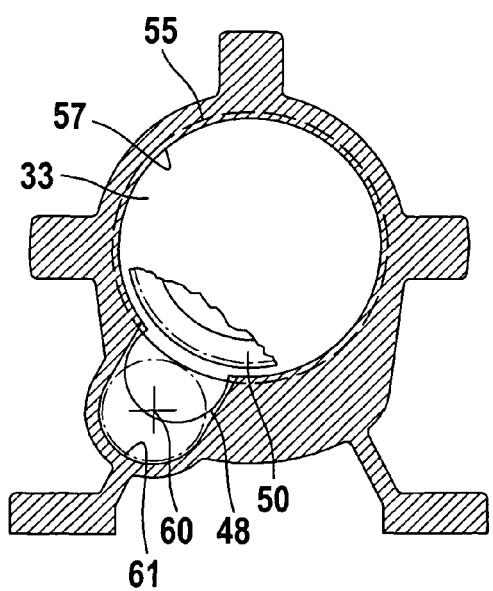
FIG. 9 shows a section as per line IX-IX of FIG. 4.
Figure 10:
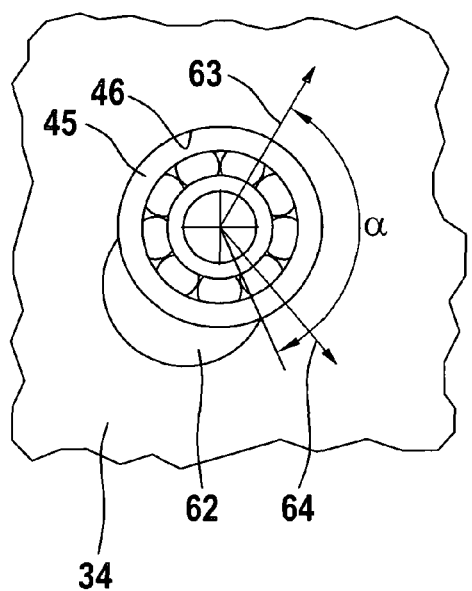
FIG. 10 shows a detail from FIG. 8, and FIGS. 11 to 14 show successive stages of the assembly of the intermediate shaft.

The faces which form the drive-input-side chamber 32 adjoin, without an undercut, the opening which is closed off by the cover 31. Said faces can therefore be shaped without a lost core in a pressure die casting process. That region of the drive-output-side chamber 33 in which the drive output shaft 51 is situated and which, in FIG. 9, appears to be delimited by the face 57 adjoins, without an undercut, the drive-output-side opening of said face 57, which opening is formed by the bearing bore 55 and the bore faces, which are if appropriate situated at the drive output side of said bearing bore 55, for holding a sealing cover 58, and which opening can therefore likewise be formed without a core.

The drive-output-side chamber 33 has, for holding the intermediate shaft 41, a widening 60 which is delimited at the drive output side by the wall 38 and therefore cannot be formed from the same side as the region associated with the drive output shaft 51. In order to be able to be formed without a core from the opposite side, the surface 61 of said widening 60 adjoins, without an undercut, a corresponding assembly opening 62 in the partition 34.

Figure 8:
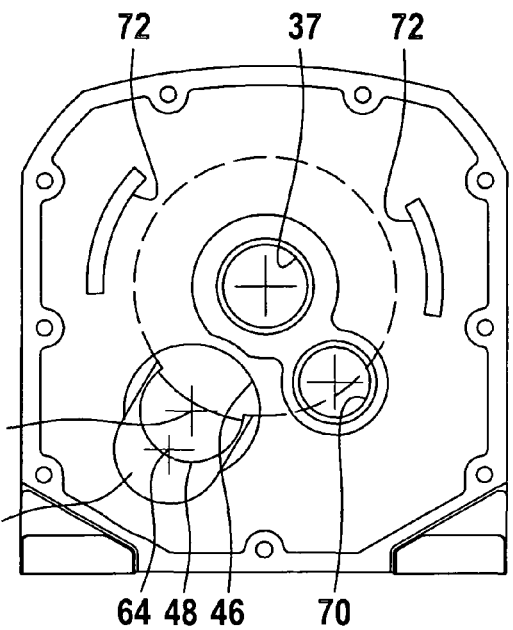
FIG. 8 is a simplified illustration corresponding to FIG. 7, without the intermediate shaft.

The widening 60 of the drive-output-side chamber 33 is larger than would be required for holding the intermediate shaft 41. Said widening 60 is specifically large enough to allow the drive-output-side bearing 47 in addition to the already-mounted drive output gearwheel 50 to pass through during assembly. Said widening 60 is expediently partially delimited by a cylindrical face 61 whose central axis 64 is offset with respect to the provided axis 65 of the intermediate shaft in the direction away from the drive output shaft 51 (FIGS. 8 and 11).

The assembly opening 62 forms a widening of the bearing bore 46 which is provided in the partition 34 for the intermediate shaft bearing 45. The widening results in a cutout in the peripheral face of the bearing bore 46, in which cutout the bearing 45 is not supported. Since the width of said cutout is however smaller than the diameter of the bearing bore, the peripheral face of the bearing bore 46 extends over more than 180°, specifically over the angle α at both sides of the radius 63 which is aligned towards the drive output shaft. Said angle is so large that the resultant 64 of the forces arising from the toothing, which resultant is offset by approximately 110° with respect to said radius 63 in the case of conventional toothings, is situated within the region supported by the bearing bore 46.

Figure 12:
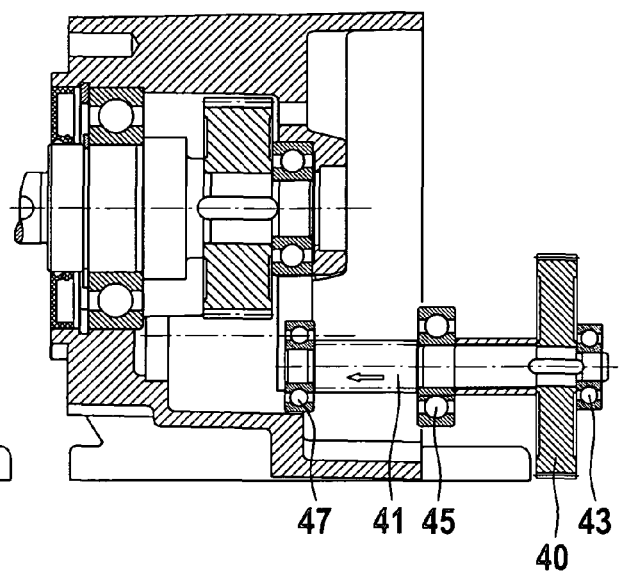
Figure 13:
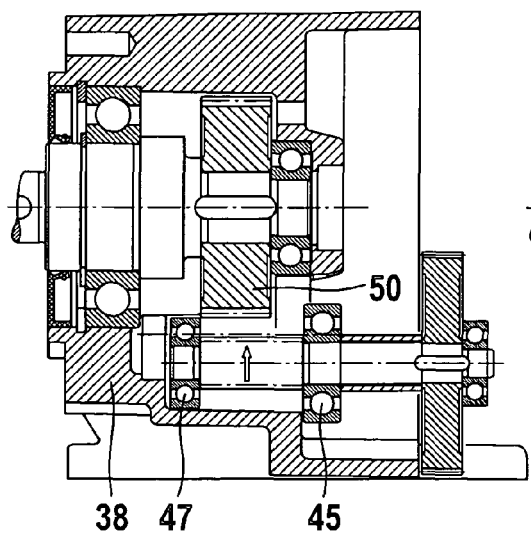

The assembly opening 62 and the widening 60 of the drive-output-side chamber 33 are large enough for the intermediate shaft 41 with the pre-assembled drive-output-side bearing 47 as per FIGS. 12 and 13 to be pushed in past the drive output gearwheel 50. This makes it possible to insert the intermediate shaft 41 with the intermediate gearwheel 40 and all the associated bearings 43, 45, 47 as a pre-assembled unit into the housing.

Figure 11:
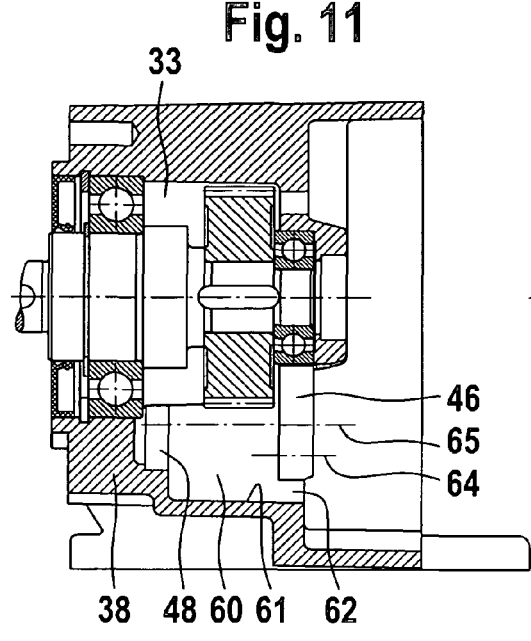
Figure 14:
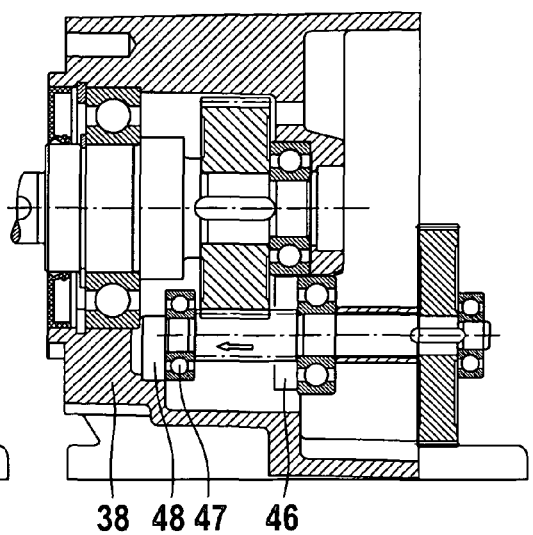

Said process is shown in various stages in FIGS. 11 to 14. In FIG. 11, it is possible to see, below the bearing bore 46 in the partition 34, the assembly opening 62 which is adjoined without an undercut by the widening 60 of the drive-output-side chamber. Firstly, said pre-assembled unit, approximately in the position of the axis 64, is pushed in the direction of the arrow in FIG. 12 until the drive-output-side bearing 47 reaches the wall 38 which contains the bearing bore 48 of said bearing 47. The unit is then pushed transversely in the direction of the arrow in FIG. 13 in order to reach the provided axial position 65. Here, the pinion 42 and the drive output gearwheel come into engagement with one another. Finally, the pre-assembled unit of the intermediate shaft 41 is pushed forwards as per FIG. 14 in the direction of the arrow until the bearings 47 and 45 have found their intended position in the bearing bores 48 and 46 (see FIG. 4). In order that the transverse movement out of the position of FIG. 13 into that of FIG. 14 is possible, the free axial spacing between the drive output gearwheel 50 and the wall 38 which forms the drive-output-side bearing bore 48 must correspond at least to the width of the drive-output-side bearing 47.

The assembly opening which is provided in the partition for the pre-assembled intermediate shaft could also be formed by the bearing bore 46 alone without the widening 62 if the bearing bore is large enough. If, however, the bearing 45 can be of small design on account of the widening 62 and on account of the additional bearing-mounting of the intermediate shaft by means of the drive-output-side bearing 47, this has the important advantage that the intermediate shaft bearing 45 in the partition 34 can be accommodated in approximately the same plane as the bearing 52 of the drive output shaft. It is thus possible with little expenditure to reduce the installation length and the weight of the transmission. It is also thereby possible to further increase the housing stiffness, which is already increased according to the invention by means of the absence of additional assembly openings. The low cost expenditure is obtained by means of the compact design, the capability for cost-effective production of the housing in a pressure die casting process, the capability for pre-assembly of all shafts, gearwheels and bearings, and the possible dispensation with centering means on the housing cover, which is explained further below.

Figure 4:
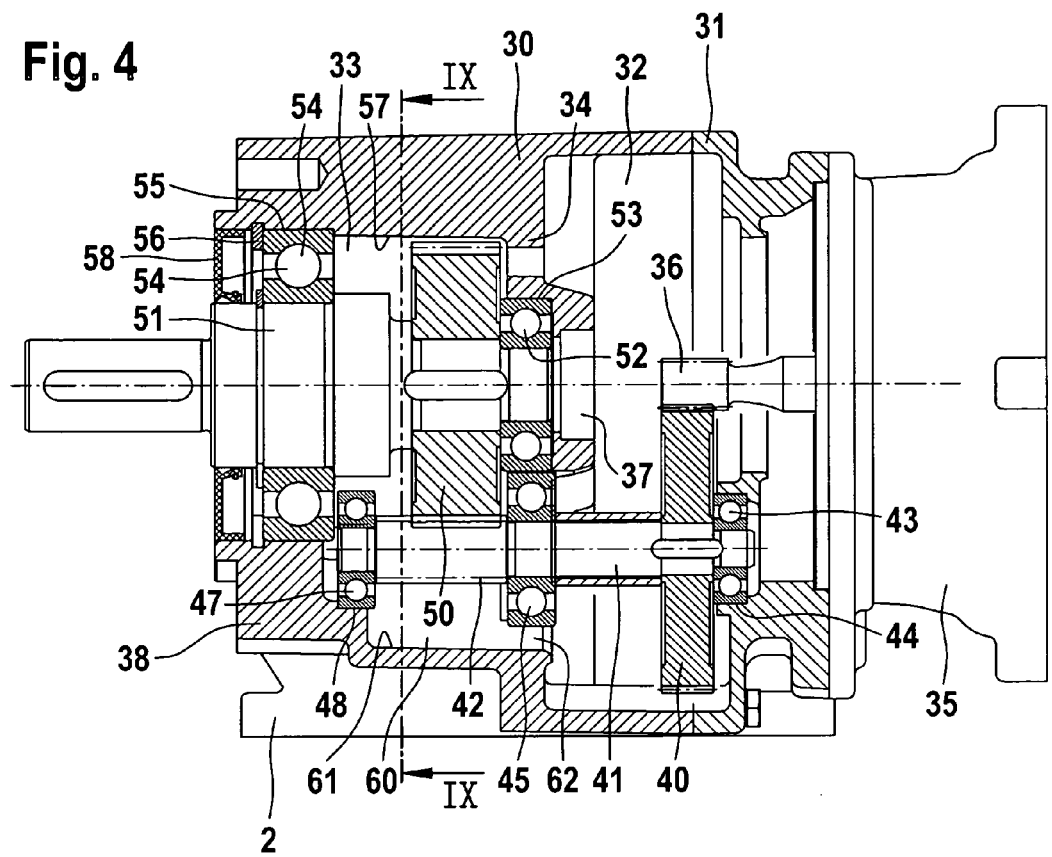
FIG. 4 shows a longitudinal section through a second exemplary embodiment as per line IV-IV of FIG. 7, FIGS. 5 and 6 show perspective views of the empty housing of the associated cover.
Figure 6:
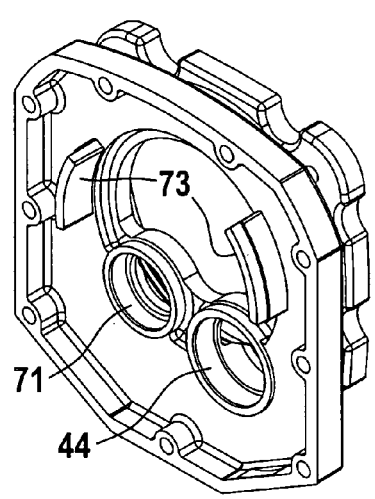
Figure 15:
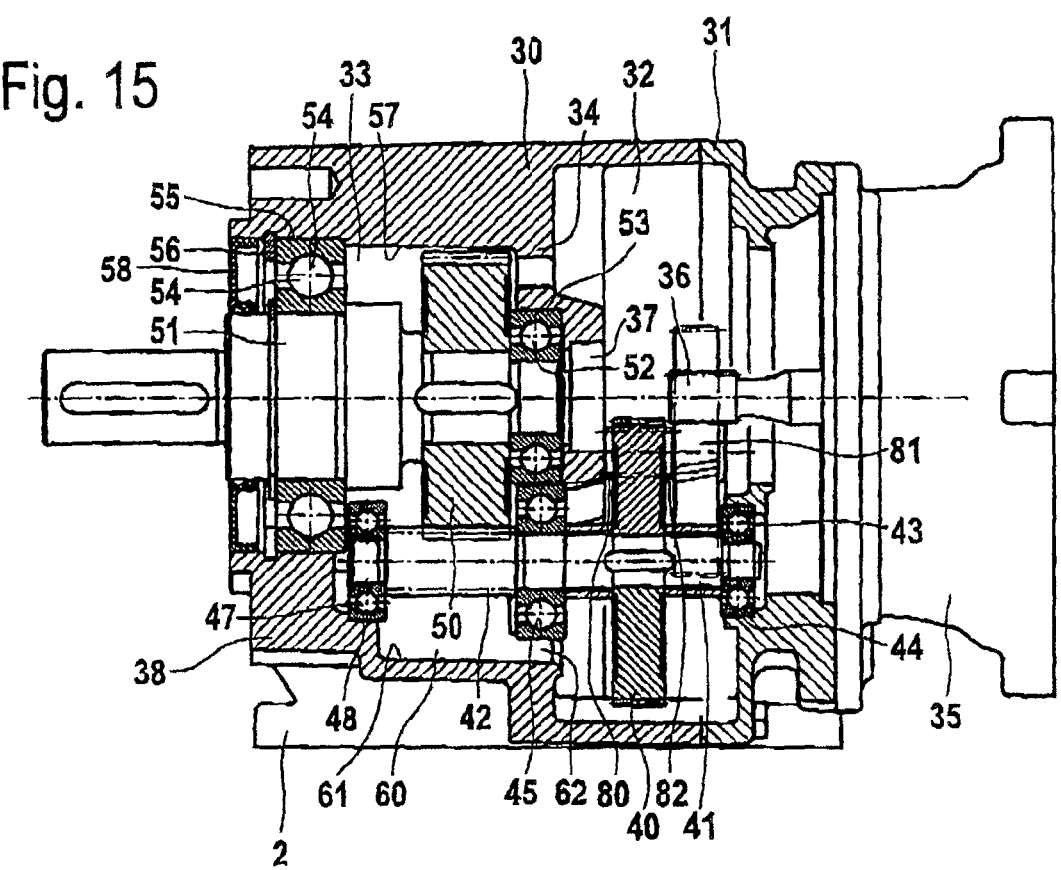
FIG. 15 shows a longitudinal section through a longitudinal section of a third exemplary embodiment.

The second exemplary embodiment shows a two-stage transmission. Said transmission can however also be of three-stage design. In FIG. 15, a corresponding third embodiment is shown which largely resembles the second exemplary embodiment. In the following, only the differences between in the two-stage and three-stage design are discussed. In the case of the third embodiment, an additional shaft 80 is arranged in the drive-input-side chamber 32, for which additional shaft the partition 34 and the cover 31 contain further bearing bores 70, 71. (See FIGS. 5 and 6). Said additional shaft 80 supports an additional gearwheel 81 on which the input drive pinion 36 acts and which is situated in the plane in which the intermediate gearwheel 40 is illustrated in the FIG. 4. The intermediate gearwheel 40 of FIG. 4 is moved to the left in the drawing on the intermediate shaft 41 in order to be able to interact with the pinion 82 of the additional shaft 80.

With regard to the desired reduction in expenditure, the triple bearing arrangement of the intermediate shaft, which is generally avoided on account of static overdeterminacy, is worth noting. In the present case, said triple bearing arrangement has on the one hand the advantage that it permits the above-described favourable dimensioning of the intermediate shaft bearing which is arranged in the partition, so that said intermediate shaft bearing can be arranged in a plane with a bearing of the drive output shaft. Said triple bearing arrangement has on the other hand the advantage that the described alternative positions for the intermediate gearwheel can be provided for two-stage and three-stage transmission, because said intermediate gearwheel is mounted at both sides. Finally, said triple bearing arrangement has the advantage of the cover centering at the bearing 44, which is arranged in the cover, of the intermediate shaft 41. Said cover centering is sufficient in the case of a two-stage design of the transmission. For the case of the three-stage design, the housing and the cover can be provided with additional pairs of interacting centering faces 72, 73. Said centering faces 72, 73 are arranged so as to effect a complementary centering action with regard to the rotational position of the cover about the axis of the intermediate shaft bearing 43. For this purpose, it is necessary for the centering face pairs to have a face component which encloses an angle of less than 90° with a radius 74, 75 which proceeds from the axis of the intermediate shaft.

The invention claimed is:

1. Two-stage or three-stage spur gear transmission
    a) having a single-piece housing which forms a drive-input-side chamber having a drive-input-side cover opening and has a cover which closes off said cover opening,
    b) having a drive output shaft which supports a drive output gearwheel between two drive output shaft bearings in a drive-output-side chamber of the housing, and
    c) having an intermediate shaft which supports, in the drive-input-side chamber an intermediate gearwheel, which is driven directly or indirectly by an input drive pinion, and an intermediate pinion, which meshes with the drive output gearwheel, and is mounted by means of two intermediate shaft bearings which are adjacent to the intermediate pinion,
    characterized
    d) in that a third intermediate shaft bearing is arranged in a bearing bore of the cover,
    e) said cover has a parting joint with said housing which runs perpendicular to the axis direction,
    f) said third intermediate shaft bearing is centered on said third intermediate shaft along said parting joint, and
    g) in that the drive output shaft can be axially mounted with the drive output gearwheel and the drive output shaft bearings in the drive-output-side chamber which is not undercut.

2. Transmission according to claim 1, characterized in that the two intermediate shaft bearings which are adjacent to the intermediate pinion are arranged in the drive-output-side chamber.

3. Transmission according to claim 2, characterized in that a drive-output-side chamber formed on the other side of a partition is delimited by two faces, the first of which adjoins, a drive-output-side bearing bore for the drive output shaft, and the second of which adjoins an opening which is provided for the mounting and assembly of the intermediate shaft in the partition, and in that the second face and the faces which delimit the drive-input-side chamber adjoin the cover opening.

4. Transmission according to claim 3, characterized in that the opening which is provided in the partition for the intermediate shaft comprises a bearing bore which is widened in the direction away from the drive output shaft by an assembly opening which is adjoined by a widening of the drive-output-side chamber, which widening is formed so as to be sufficiently wide for the passage, during assembly, of the drive-output-side intermediate shaft bearing in addition to the drive output gearwheel.

5. Transmission according to claim 4, characterized in that the bearing bore, which is provided in the partition for the intermediate shaft, comprises a cut out in the peripheral face of the bearing bore wherein the width of said cut out is smaller than the diameter of the bearing bore.

6. Transmission according to claim 2, characterized in that a drive-output-side chamber opens towards the drive input side.

7. Transmission according to claim 2, characterized in that the drive-output-side chamber is formed by walls which extend substantially axially parallel.

8. Transmission according to claim 1, characterized in that a drive-output-side chamber formed on the other side of a partition is delimited by two faces, the first of which adjoins a drive-output-side bearing bore for the drive output shaft, and the second of which adjoins an opening which is provided for the mounting and assembly of the intermediate shaft in the partition, and in that the second face and the faces which delimit the drive-input-side chamber adjoin the cover opening.

9. Transmission according to claim 8, characterized in that the drive-output-side chamber is formed by walls which extend substantially axially parallel.

10. Transmission according to claim 8, characterized in that the opening which is provided in the partition for the intermediate shaft comprises a bearing bore which is widened in the direction away from the drive output shaft by an assembly opening which is adjoined by a widening of the drive-output-side chamber, which widening is formed so as to be sufficiently wide for the passage, during assembly, of the drive-output-side intermediate shaft bearing in addition to the drive output gearwheel.

11. Transmission according to claim 10, characterized in that the drive-output-side chamber is formed by walls which extend substantially axially parallel.

12. Transmission according to claim 10, characterized in that the bearing bore which is provided in the partition for the intermediate shaft, comprises a cutout in the peripheral face of the bearing bore, wherein the width of said cutout is smaller that the diameter of the bearing bore.

13. Transmission according to claim 12, characterized in that the drive-input-side bearing of the drive output shaft and the bearing that is central of the three intermediate bearings of the intermediate shaft are arranged axially offset with respect to one another, with said central bearing being situated closer to the intermediate pinion.

14. Transmission according to claim 12, characterized in that the drive-output-side bearing of the drive output shaft and the drive-output-side bearing of the intermediate shaft are arranged axially offset with respect to one another, with said drive-output-side bearing being situated closer to the intermediate pinion.

15. Transmission according to claim 12, characterized in that the drive-output-side chamber is formed by walls which extend substantially axially parallel.

16. Transmission according to claim 1, characterized in that a drive-output-side chamber opens towards the drive input side.

17. Transmission according to claim 1, characterized in that the drive-output-side chamber is formed by walls which extend substantially axially parallel.

18. Transmission according to claim 1, characterized in that, for alternatively two- and three-stage design, a sufficient space is provided in the drive-input-side chamber for the accommodation of the intermediate gearwheel and an additional gearwheel in the axial direction next to one another, and in the case of a two-stage design, the intermediate gearwheel is arranged closer to the third intermediate bearing than to the two intermediate shaft bearings of the intermediate shaft and in the case of a three-stage design, closer to the two intermediate shaft bearings.

19. Transmission according to claim 1, characterized in that, in the case of a two-stage transmission, the cover has no further centering means other than the drive-input-side bearing of the intermediate shaft.

20. Transmission according to claim 1, characterized in that, in the case of a housing which is designed for a three-stage transmission with an additional shaft in the drive-input-side chamber, a further centering means is provided, the centering action of which is aligned substantially transversely to a radius which proceeds from the axis of the intermediate shaft.

\* \* \* \* \*